United States Patent [19]

Gumkowski

[11] Patent Number: 5,485,625

[45] Date of Patent: Jan. 16, 1996

[54] METHOD AND APPARATUS FOR MONITORING EXTERNAL EVENTS DURING A MICROPROCESSOR'S SLEEP MODE

[75] Inventor: Gregory T. Gumkowski, Livonia, Mich.

[73] Assignee: Ford Motor Company, Dearborn, Mich.

[21] Appl. No.: 906,180

[22] Filed: Jun. 29, 1992

[51] Int. Cl.⁶ ..................................................... G06F 11/34
[52] U.S. Cl. ........................... 395/800; 395/750; 395/775; 364/707; 365/229; 365/227
[58] Field of Search ...................... 395/750, 550, 395/226, 275; 364/707; 379/413; 365/226

[56] References Cited

U.S. PATENT DOCUMENTS

| | | | |
|---|---|---|---|
| 4,109,315 | 8/1978 | Pan | 364/707 |
| 4,501,005 | 2/1985 | Miller | 377/20 |
| 4,698,748 | 10/1987 | Juzswik et al. | 395/750 |
| 4,809,280 | 2/1989 | Shonaka | 371/62 |
| 4,851,987 | 7/1989 | Day | 395/550 |
| 4,897,807 | 1/1990 | Zohsawa | 364/707 |
| 4,964,123 | 10/1990 | Umemoto | 371/12 |
| 5,083,266 | 1/1992 | Watanabe | 395/275 |

OTHER PUBLICATIONS

Microprocessor, Microcontroller and Peripheral Data, vol. II, cover and pp. 3–1518 to 3–1531 (1988).

*Primary Examiner*—Thomas G. Black
*Assistant Examiner*—Cuan Pham
*Attorney, Agent, or Firm*—Kim Scott; Roger L. May

[57] ABSTRACT

An external oscillator is connected to the port accumulator of a microprocessor and supplies event signals to the microprocessor during its sleep state (following the execution of a STOP or WAIT instruction). Because the port accumulator within the microprocessor is capable of receiving and retaining a count during the microprocessor's mode, even though normal processing is suspended, the microprocessor is able to acquire information concerning external events which occur during the sleep mode. The technique may be used to indicate when the duration of the sleep mode exceeds a predetermined value.

7 Claims, 1 Drawing Sheet

METHOD AND APPARATUS FOR MONITORING EXTERNAL EVENTS DURING A MICROPROCESSOR'S SLEEP MODE

FIELD OF THE INVENTION

This invention relates to electronic digital processing apparatus and, more particularly, to methods and apparatus for using an integrated circuit microprocessor to monitor events which occur during the microprocessor's "sleep mode" when the microprocessor's capabilities are largely disabled to reduce power consumption.

BACKGROUND OF THE INVENTION

Many integrated circuit microprocessors are adapted to enter a "sleep mode" in order to reduce power consumption when processing is not needed. Such processors are adapted to execute instructions, variously called WAIT, STOP or SLEEP instructions, which may be included in software routines to suspend power-consuming functions within the processor. Typically, those portions of the microprocessor which are cycling at high clock rates are totally disabled to drastically reduce the power consumed by the device. In some processors, different instructions may be available to the programmer to disable the processor to different degrees; for example, a STOP instruction may completely disable both the processor and the internal clock, whereas a WAIT instruction may retain selected internal functions, such as an interval timer for generating a hardware interrupt which reawakens the processor after a predetermined period of inactivity.

As used in this specification, the term "sleep mode" is intended to refer to any such power conservation mode which renders the processor temporarily unable to execute instructions in the usual way. To permit a microprocessor which has been placed in sleep mode to promptly resume normal operations, the contents of internal data and address registers are saved. Microprocessors having these characteristics are available from several manufacturers and include the MC68HC11 family of microcontrollers manufactured by Motorola Inc., Oak Hill, Tex., which are described in detail in Volume II of *Motorola Microprocessor, Microcontroller and Peripheral Data*, Motorola Inc. (1988).

Microprocessors of this class have been used extensively to implement battery powered systems, such as automotive electronic controls, which preferably consume a minimum amount of power when the controls are not in use. In automotive systems, processors used for control purposes may be placed in their sleep mode when the automobile's ignition key is turned off. By way of example, U.S. Pat. No. 4,698,748 describes an automotive control system employing a processor which enters a sleep mode to conserve power with the ignition key is off.

SUMMARY OF THE INVENTION

It is an object of this invention to monitor or time external events occurring while a processor is its sleep mode, or to time the duration of the sleep mode itself, and to make the resulting information available for further processing as soon as the processor is reawakened. For example, in an automotive control system, it is desirable to reset certain fuel control values stored in memory whenever the ignition switch has been turned off for longer than a predetermined period (e.g., two hours). Since the processor itself has been disabled, it is ordinarily necessary to provide external circuitry which is operational during the processor's sleep state in order to create such information and supply it to the processor via a processor port after normal processing is resumed.

In accordance with the present invention, methods and apparatus are employed to monitor external events which occur during the sleep state of an integrated circuit processor by programming the processor to initialize an input port accumulator prior to entering the sleep state, deliver event signals to the accumulator via an input port during the sleep mode, and process the count value held in the accumulator after the sleep mode is terminated.

In this way, it is not necessary to provide external event processing circuitry such as an external counter, or means for initializing such a counter, or means for transmitting the count to the microprocessor at the conclusion of the sleep mode. In the specific embodiment to be described, the only additional external circuitry provided is a simple oscillator coupled to a processor input port to supply low frequency pulses during the sleep mode. All other signal processing takes place within the processor, which is accordingly able to acquire information concerning external events during the processor's sleep mode when internal timing and processing functions are disabled.

DESCRIPTION OF THE PREFERRED EMBODIMENT

Figure 1:
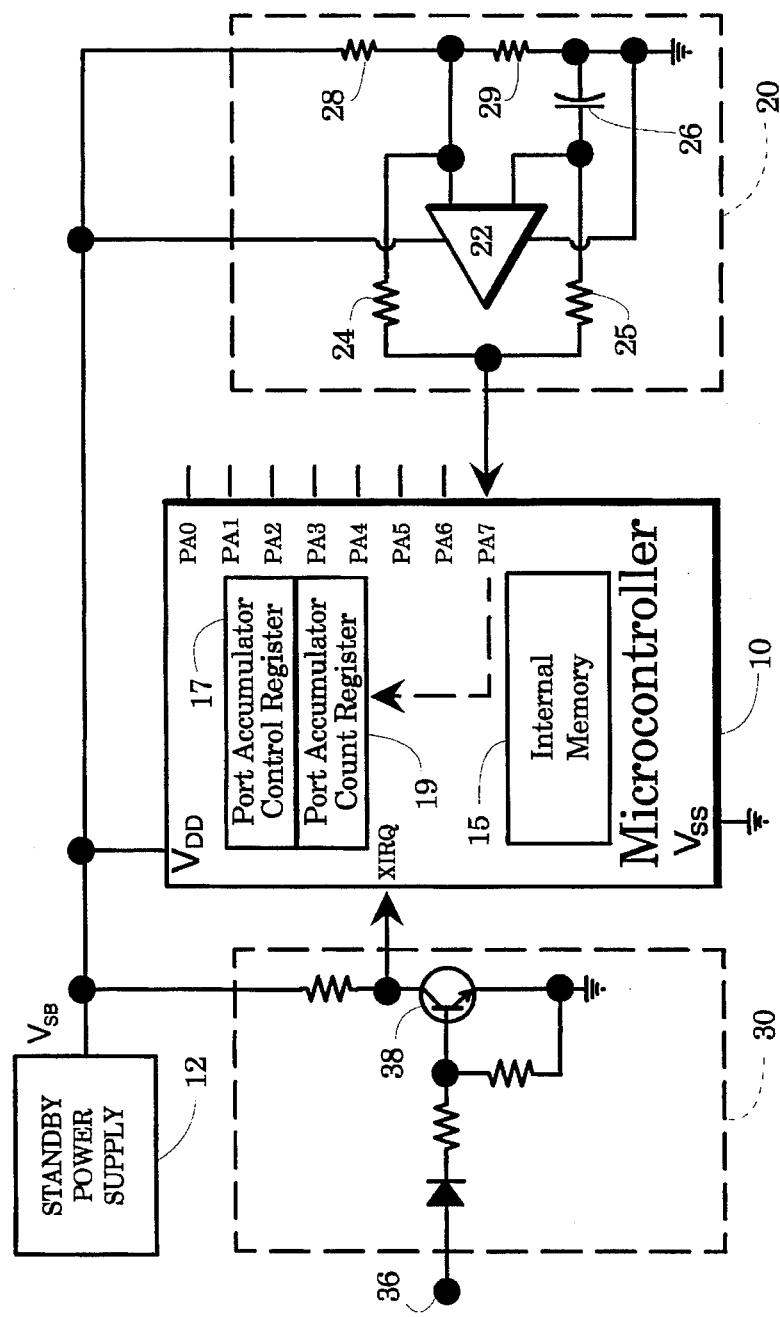
FIG. 1 is a schematic diagram of a preferred embodiment of the invention.

The present invention may be readily implemented by adding a suitable source of external event signals to a conventional integrated circuit processor such as the microcontroller 10 seen in FIG. 1. The microprocessor 10 may be implemented by a variety of commercially available devices, such as the Motorola model MC68HC11A8 microcontroller which is adapted to execute both WAIT and STOP instructions to place the processor in a dormant sleep mode. During its sleep mode, the microcontroller 10 is powered by a standby voltage from an available source 12 connected to its $V_{CC}$ terminal. The microcontroller's $V_{SS}$ terminal is grounded.

After executing a WAIT instruction, the MC68HC11A8 microcontroller 10 can be reawakened by its own internal timer (not shown), or by an externally applied interrupt or reset signal. After executing a STOP instruction, internal timer interrupts are also disabled and the processor can only be reawakened by an external reset or interrupt.

While the microcontroller 10 is no longer able to process data in the usual way during the sleep state, is capable of receiving and storing information received at its ports. The present embodiment preferably utilizes an input port capability found in some processors, such as the members of the Motorola MC68HC11 family of microcontrollers, which allows a selected input port to not only receive but also accumulate external signals.

In the MC68HC11A8, port A may be configured for a selected one of three available input capture functions, one of which is the pulse accumulator function which is selected by loading the appropriate value into the port accumulator control register 17 (addressable at location 1026 hexadecimal in the microcontroller's register block address space). When port A is configured to function as a pulse accumulator input, external event pulses applied to pin 7 of port A (pin PA7 in FIG. 1) are accumulated (counted) in an 8-bit hardware pulse accumulator count register seen at 19 within the microcontroller 10. The count held in the pulse accumulator count register 19 is addressable at location 1027 hexadecimal. Importantly, the pulse accumulator count register 19 is not disabled during the sleep state and may be used as hereinafter described to provide information to the microcontroller concerning events which occurred while the microcontroller was in its sleep mode. The values in registers 18 and 19 are manipulated by instructions in software routines stored in an internal read-only memory (ROM and/or EPROM) indicated generally at 15 in FIG. 1.

As seen in FIG. 1, a fixed-frequency oscillator seen within the dashed rectangle 20 applies pulse signals having a predetermined repetition rate to pin PA7 of the microprocessor 10. The pulse generator 20 employs a conventional integrated circuit operational amplifier 22 interconnected with a positive feedback resistor 24, a negative feedback resistor 25, a capacitor 26 connected between the negative input to amplifier 22 and ground, and an threshold-setting voltage divider consisting of resistors 28 and 29 serially connected between the standby voltage source 12 and ground. The positive input to amplifier 22 is connected to the junction of resistances 28 and 29. To provide a pulse separation of 28.1 seconds (such that the 8-bit pulse accumulator 19 counts to the overflow count of 256 in 2 hours), the element values for the pulse generator 20 are given by the table below may be used:

| Element | Value |
|---|---|
| Resistor 24 | 100 kohms |
| Resistor 25 | 620 kohms |
| Capacitor 26 | 33 microfarads |
| Resistor 28 | 100 kohms |
| Resistor 29 | 100 kohms |

The processor may be reawakened when desired by a suitable external interrupt request signal applied to the microcomputer's XIRQ terminal. This interrupt request signal is generated by the circuitry shown within the dashed line rectangle 30 in FIG. 1. To reawaken the microcontroller, a positive reset signal is applied to input terminal 36 which turns ON transistor 38 to ground the microcontroller's XIRQ pin, restarting normal processing.

Figure 2:
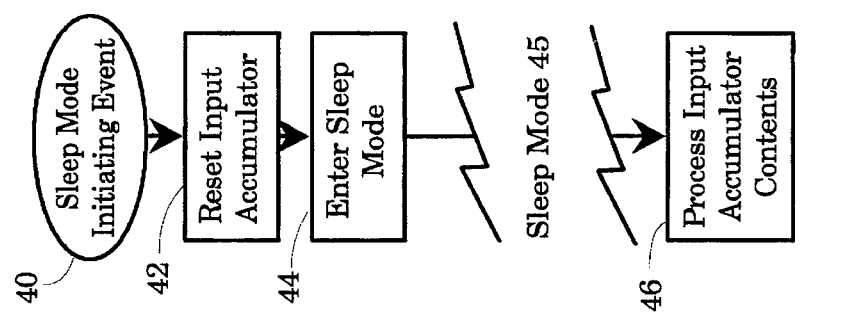
FIG. 2 is a flow chart illustrating the operations performed by the microprocessor in accordance with the invention.

The sequence of operations executed by the microprocessor 10 is shown in FIG. 2. Some event (such as turning off a vehicle ignition key) indicated at 40 initiates the processor's entry into sleep mode. In response to the event 40, the microprocessor executes instructions stored in the memory 15 at step 42 to initialize the input accumulator by storing the appropriate value in the port accumulator control register 17 in order to properly configure port A as a port accumulator input. In addition, at initialization step 42, count register 19 is initialized by setting its contents to zero, and bit 5 of the timer interrupt flag register (discussed below) at address location 1025 (hexadecimal) is cleared. The microcontroller then executes a WAIT (wait for interrupt) or STOP instruction to enter the power conservation sleep mode for an indefinite period of time.

During the sleep interval seen at 45 in FIG. 2, pulses from the low-frequency external generator 20 are accumulated in the 8-bit port accumulator count register 19, up to a count of $FF (hexadecimal) or 255 (decimal). On the next pulse after this full count is reached, the count register overflows, and this overflow condition is recorded by setting the pulse accumulator overflow interrupt flag (bit 5 of the timer interrupt flag register 2, not shown in FIG. 1, which is addressable at 1025 hexadecimal in the microcontroller's address space). Consequently, when the microcontroller is reawakened, the duration of any sleep mode interval less than 2 hours may be determined from the contents of the port accumulator count register 10, and a duration of greater than 2 hours is indicated if the overflow interrupt flag bit has been set. In this way, the duration of the sleep mode may be determined without the necessity of using any additional external circuitry other than the single oscillator 20.

It is to be understood that numerous modifications may be made to the specific physical structures and methods of operation which have been described above without departing from the true spirit and scope of the invention.

What is claimed is:

1. An integrated circuit processor
comprising, in combination,
means for executing an instruction to cause said processor to enter a sleep mode during which the operation of the processor is suspended to conserve power,
a reset terminal for receiving an externally produced reset signal,
means within said processor for terminating said sleep mode in response to the receipt of said reset signal,
an input port, and
an accumulator operable during said sleep mode for counting external event signals applied to said input port,
an arrangement for monitoring external conditions occurring during said sleep mode, said arrangement comprising, in combination,
means responsive to a sleep mode initiating signal for initializing said accumulator to a predetermined state and thereafter causing said processor to enter said sleep mode,
a signal source connected to supply a sequence of external event signals to said input port during said sleep mode,
a source of a reset signal connected to said reset terminal for terminating said sleep mode, and
means for processing the value stored in said accumulator at the termination of said sleep mode.

2. Apparatus as set forth in claim 1 wherein said signal source supplies a sequence of pulses at timed intervals, wherein said accumulator stores a value equal to the count of said pulses received during said sleep mode such that the count stored in said accumulator is indicative of the duration of said sleep mode.

3. Apparatus as set forth in claim 2 wherein said processor further includes a flag register and overflow detection means connected to said accumulator for placing a predetermined value in said flag register whenever the count held in said accumulator exceeds a predetermined value whereby the value in said flag register indicates whether the duration of said sleep mode exceeded a predetermined interval.

4. The method of measuring the duration of an interval during which an integrated circuit processor was operating in a disabled sleep mode, said processor being provided with an accumulator for counting external event signals applied to at least one input port during said sleep mode, said method comprising, in combination, the steps of:

initializing said accumulator to a predetermined count prior to the commencement of said sleep mode, supplying a sequence of timed pulses to said input port such that said accumulator stores a count of said pulses, resetting said processor to terminate said sleep mode, and processing the value stored in said accumulator to obtain an indication of the duration of said sleep mode.

5. The method of claim 4 wherein said step of initializing is carried out by said processor executing stored instructions for placing a predetermined value in said accumulator followed by an instruction for placing said processor in said sleep mode.

6. The method of claim 5 wherein said step of supplying a sequence of timed pulses to said input port is carried out by connecting a fixed frequency oscillator to said input port.

7. The method of claim 6 wherein said step of processing said value is carried out by said processor executing stored instructions for determining whether the count stored in said accumulator exceeded a predetermined value.

\* \* \* \* \*